US009425966B1

(12) United States Patent
Potlapally et al.

(10) Patent No.: US 9,425,966 B1
(45) Date of Patent: Aug. 23, 2016

(54) SECURITY MECHANISM EVALUATION SERVICE

(71) Applicant: Amazon Technologies, Inc., Reno, NV (US)

(72) Inventors: Nachiketh Rao Potlapally, Arlington, VA (US); Eric Jason Brandwine, Haymarket, VA (US); Gregory Alan Rubin, Seattle, WA (US); Patrick James Ward, Snoqualmie, WA (US); James Leon Irving, Jr., Herndon, VA (US); Andrew Paul Mikulski, Fairfax, VA (US); Donald Lee Bailey, Jr., Penn Laird, VA (US)

(73) Assignee: Amazon Technologies, Inc., Reno, NV (US)

( * ) Notice: Subject to any disclaimer, the term of this patent is extended or adjusted under 35 U.S.C. 154(b) by 87 days.

(21) Appl. No.: 13/826,888

(22) Filed: Mar. 14, 2013

(51) Int. Cl.
*H04L 29/06* (2006.01)
*H04L 9/32* (2006.01)
*H04L 9/30* (2006.01)

(52) U.S. Cl.
CPC .............. *H04L 9/3263* (2013.01); *H04L 9/30* (2013.01); *H04L 63/0823* (2013.01)

(58) Field of Classification Search
CPC .............. H04L 63/045; H04L 63/0442; H04L 63/0823; H04L 9/30; H04L 9/3263
USPC ............ 713/150, 155–156, 158; 726/6–7, 10, 726/25
See application file for complete search history.

(56) References Cited

U.S. PATENT DOCUMENTS

| | | | | |
|---|---|---|---|---|
| 5,903,882 A * | 5/1999 | Asay et al. | | 705/44 |
| 6,307,938 B1 * | 10/2001 | Matyas et al. | | 380/44 |
| 6,321,333 B1 | 11/2001 | Murray | | |
| 6,948,061 B1 * | 9/2005 | Dierks | | 713/159 |
| 7,210,035 B2 * | 4/2007 | Doyle et al. | | 713/157 |
| 7,337,315 B2 * | 2/2008 | Micali | | 713/157 |
| 7,395,430 B2 | 7/2008 | Gupta | | |
| 8,185,473 B2 * | 5/2012 | Ginter et al. | | 705/52 |
| 8,219,819 B2 | 7/2012 | Little | | |

(Continued)

OTHER PUBLICATIONS

Brian Carrier "Hash Database Help" downloaded on Mar. 8, 2013 from www.sleuthkit.org/autopsy/help/hash_db.html, pp. 1-2.

(Continued)

*Primary Examiner* — Hadi Armouche
*Assistant Examiner* — Sher A Khan
(74) *Attorney, Agent, or Firm* — Robert C. Kowert; Meyertons, Hood, Kivlin, Kowert & Goetzel, P.C.

(57) ABSTRACT

Methods and apparatus for a security mechanism evaluation service are disclosed. A storage medium stores program instructions that when executed on a processor define a programmatic interface enabling a client to submit an evaluation request for a security mechanism. On receiving an evaluation request from a client indicating a particular security mechanism using public-key encryption, the instructions when executed, identify resources of a provider network to be used to respond. The instructions, when executed, provide to the client, one or more of: (a) a trustworthiness indicator for a certificate authority that issued a public-key certificate in accordance with the particular security mechanism; (b) a result of a syntax analysis of the public-key certificate; or (c) a vulnerability indicator for a key pair.

22 Claims, 9 Drawing Sheets

(56) References Cited

U.S. PATENT DOCUMENTS

| | | | |
|---|---|---|---|
| 8,266,425 B2 | 9/2012 | Fahn et al. | |
| 8,312,528 B2 | 11/2012 | Saarepera et al. | |
| 8,683,052 B1 * | 3/2014 | Brinskelle | 709/228 |
| 8,745,088 B2 * | 6/2014 | Balakrishnaiah | G06Q 10/10 707/706 |
| 9,083,696 B1 * | 7/2015 | Khaitan | H04L 63/0823 |
| 2002/0087884 A1 * | 7/2002 | Shacham et al. | 713/201 |
| 2002/0165824 A1 | 11/2002 | Micali | |
| 2003/0014655 A1 * | 1/2003 | England et al. | 713/200 |
| 2004/0059767 A1 * | 3/2004 | Liardet | 708/491 |
| 2004/0111379 A1 * | 6/2004 | Hicks et al. | 705/76 |
| 2005/0010800 A1 * | 1/2005 | Lee | G06F 21/554 726/26 |
| 2005/0138386 A1 | 6/2005 | Le Saint | |
| 2006/0112273 A1 * | 5/2006 | Tuyls et al. | 713/171 |
| 2006/0156020 A1 * | 7/2006 | Minium | G06F 21/6218 713/182 |
| 2008/0086342 A1 * | 4/2008 | Curry | G06Q 40/025 705/38 |
| 2009/0178129 A1 * | 7/2009 | Cross | H04L 9/3213 726/10 |
| 2011/0239276 A1 * | 9/2011 | Garcia Garcia | H04L 63/102 726/4 |
| 2012/0124369 A1 * | 5/2012 | Amenedo et al. | 713/156 |
| 2012/0177036 A1 * | 7/2012 | Olesinski et al. | 370/389 |
| 2012/0240192 A1 * | 9/2012 | Orazi | G06F 21/10 726/4 |
| 2012/0311703 A1 | 12/2012 | Yanovsky et al. | |
| 2013/0081129 A1 * | 3/2013 | Niemela | H04L 63/0236 726/11 |
| 2013/0174222 A1 * | 7/2013 | Ogle | G06F 21/31 726/3 |
| 2013/0276066 A1 * | 10/2013 | Buehl | G06F 21/335 726/4 |
| 2013/0326220 A1 * | 12/2013 | Connelly | H04L 63/045 713/168 |
| 2014/0089189 A1 * | 3/2014 | Vasireddy | G06Q 20/4016 705/44 |
| 2015/0186845 A1 * | 7/2015 | Dale | G06Q 10/107 709/206 |

OTHER PUBLICATIONS

"IP/Domain Lookups" downloaded on Mar. 8, 2013 from www.barracudacentral.org/lookups, 2009-2012 Barracuda Networks, p. 1.
"CloudCracker" downloaded on Mar. 8, 2013 from www.cloudcracker.com, 2012 Thoughtcrime Labs, pp. 1-2.
Dan Brown "Convergence: Another Way to Trust" downloaded on Mar. 8, 2013 from blog.bit9.com/2011/08105/convergence-another-way-to-trust/, published Aug. 5, 2011 pp. 1-7.
Nadia Heninger, et al "Widespread Weak Keys in Network Devices" downloaded on Mar. 7, 2013 from factorable.net p. 1.
"IDefense Security Intelligence Services" downloaded Mar. 8, 2013 from www.verisigninc.com/en_US/products-and-services/network-intelligence-availability/idefense/index.xhtml, 2011-2013 VeriSign, Inc pp. 1-2.
"Web Security" downloaded Mar. 8, 2013 from www.mcafee.com/us/products/email-and-web-security/web-security.aspx pp. 1-5.
"Perspectives Project—What is Perspectives" downloaded Mar. 8, 2013 from perspectives-project.org pp. 1-3.
"Debian Wiki—Identifying Weak Keys" downloaded Mar. 8, 2013 from wiki.debian.org/SSLkeys#Identifying_Weak_Keys pp. 1-19.
"Symantec Certificate Intelligence Center—Centralized SSL Discovery and Management Service for the Enterprise" downloaded Feb. 25, 2013 from www.symantec.com/verisign/ssl-certificates/certificate-intelligence-center?inid=vrsn_symc_ssl_CIC, published Feb. 21, 2013 pp. 1-3.
"The EFF SSL Observatory" downloaded Mar. 8, 2013 from https://www.eff.org/observatory published Aug. 3, 2010, pp. 1-2.
Nadia Heninger, et al "Mining Your Ps and Qs: Detection of Widespread Weak Keys in Network Devices" Proceedings of the 21st USENIX Security Symposium, published Jul. 2, 2012, pp. 1-16.
U.S. Appl. No. 14/737,471, filed Jun. 11, 2015, Gregory Alan Rubin et al.

* cited by examiner

Security Evaluation Settings Page https://<website>.com/SESettings

Dear John Doe,
Thanks for choosing the Security Evaluation Service. ← 403

Please select the settings you would like for your security mechanism evaluation options.

| | | |
|---|---|---|
| Client ID to be billed: | 3218938492 (John Doe, Seattle, WA) | ← 405 ← 471 |
| Service usage type/duration | (Default) Subscription/6-months (click here to change) | ← 407 |
| Security mechanisms to evaluate: | (Default) X.509 certificate-based PKE on all my instances (click here to change) | ← 409 |
| Analysis types desired: | (Default) Deep analysis: Key vulnerability + certificate content check + reputation analysis (click here to change) | ← 411 |
| Certificate transfer mechanism: | (Default) Push (I will send the certificates) (click here to change) | ← 413 |
| Pricing policy: | (Default) Subscription fee $Y + US$X for every 1000 certificates analyzed (click here to change) | ← 415 |
| Constraints: | (Default) Provide result within 5 minutes (click here to change) | ← 417 |
| Evaluation result format: | (Default) Summary+details, HTML (click here to change) | ← 419 |

For additional customization click here. ← 421

Submit ← 490

SECURITY MECHANISM EVALUATION SERVICE

BACKGROUND

The security of Internet-based services is a topic of increasing interest and concern, especially as the number and sophistication of cyber-attacks increases. Various types of security protocols and mechanisms are used to protect data for network-based interactions, including, for example, protocols that rely on public-key certificates (such as X.509 digital certificates). Public-key certificates are used in implementations of various popular security protocols such as TLS (Transport Layer Security), TLS's predecessor SSL (Secure Sockets Layer), SSH (Secure Shell), SFTP (Secure File Transfer Protocol) and the like. Third party entities called certificate authorities (CAs) are typically responsible for issuing the digital certificates, certifying the ownership of a public key by the named subject indicated in a given certificate that contains the public key. Users of the protocols that utilize the public-key infrastructure rely upon the correctness of the information contained in the digital certificates, and thus rely on the trustworthiness of the CAs themselves.

A number of different techniques have been used to attempt to compromise security mechanisms that rely on public-key certificates. For example, some attackers may be able to compute private keys from public keys if the quality of the random numbers used to generate the public-private key pair is insufficiently high, or if duplicate or default keys are issued by CAs. Other potential weaknesses of the public-key infrastructure include impersonation, compromise or manipulation of root certificate authority information, as well as ill-formed fields in the digital certificates. As a result of attacks aimed at such weaknesses, malicious entities may be able to pass off a fraudulent public-key certificate as a legitimate certificate, thereby leading to such problems as disclosure of sensitive data, unauthorized financial transactions, identity theft, and the like.

As more and more financial and business transactions are conducted online, the numbers of users potentially susceptible to attacks targeting the vulnerabilities of such security mechanisms also rises. Typically, users may not have access to the expertise, or the extensive computational resources, that may be required to gauge the relative strengths and weaknesses of the various security mechanisms that they have to use. Users of the security mechanisms may thus find it difficult to estimate the extent to which the mechanisms are truly secure.

BRIEF DESCRIPTION OF DRAWINGS

FIG. 4 illustrates an example web-based interface enabling a client of a security mechanism evaluation service to specify security evaluation preferences and settings, according to at least some embodiments.

Figure 1:
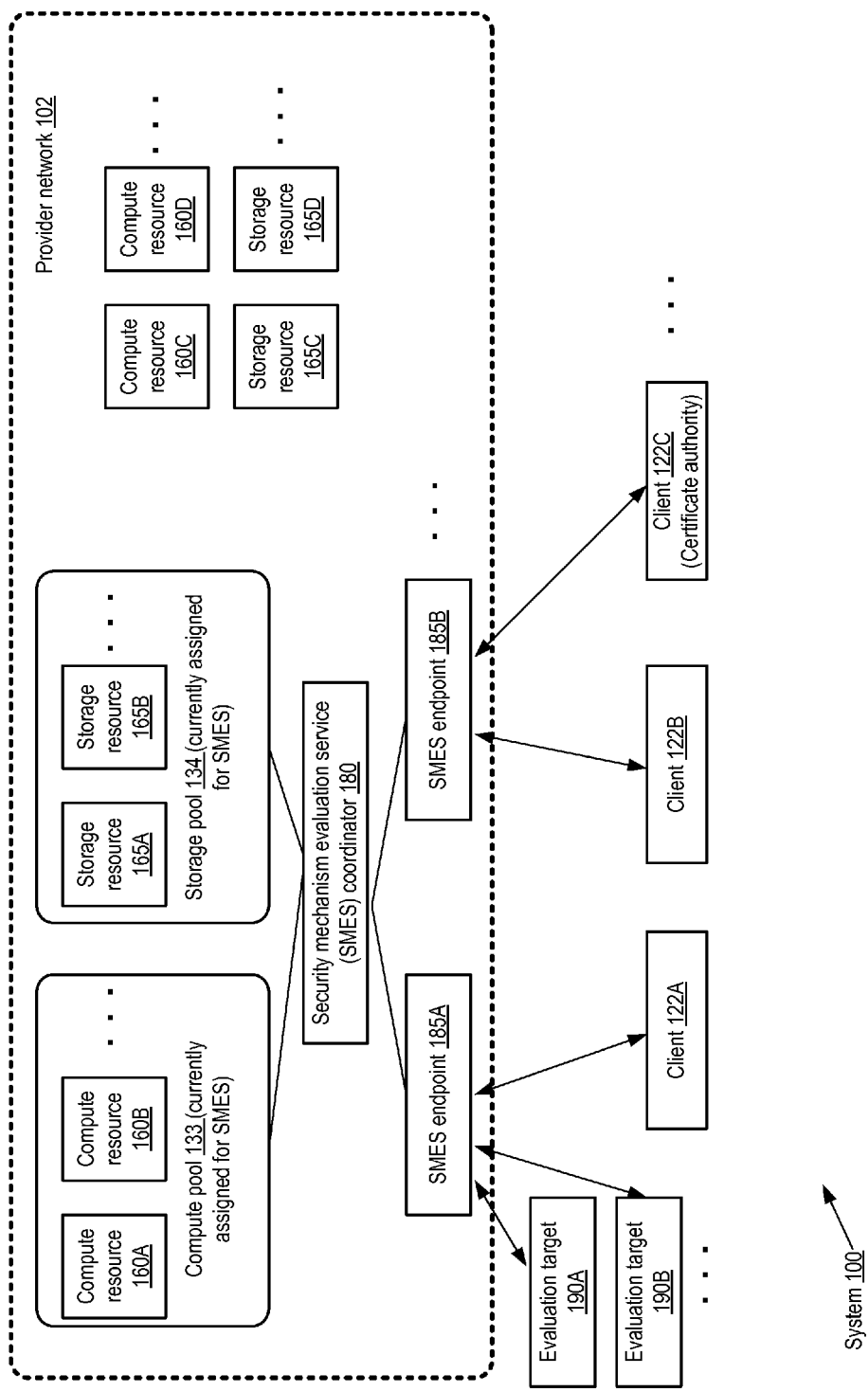
FIG. 1 illustrates an example system environment, according to at least some embodiments.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to.

DETAILED DESCRIPTION

Various embodiments of methods and apparatus for implementing a network-accessible security mechanism evaluation service using the resources of a provider network are described. Networks set up by an entity such as a company or a public sector organization to provide one or more services (such as various types of cloud-based computing or storage services) accessible via the Internet and/or other networks to a distributed set of clients may be termed provider networks in this document. A given provider network may include numerous data centers (which may be distributed across different geographical regions) hosting various resource pools, such as collections of physical and/or virtualized computer servers, storage devices, networking equipment and the like, needed to implement, configure and distribute the infrastructure and services offered by the provider. A number of different hardware and/or software components, some of which may be instantiated or executed at different data centers or in different geographical regions, may collectively be used to implement the security mechanism evaluation service in various embodiments. The term SMES may be used herein to refer to the security mechanism evaluation service. In at least some embodiments, the SMES may serve as a clearinghouse of various types of information about a growing database of security mechanisms and/or specific implementations or instances of such mechanisms. The types of information available to clients of the SMES may include, for example, any combination of: analyses of vulnerability levels of specific keys employed for encryption, past history and trustworthiness of entities participating in the public-key infrastructure (such as certificate authorities responsible for certifying X.509 digital certificates, specific vendors that provide or deploy key generating equipment, networking equipment such as routers, or other computing equipment or software used for network security), failure rates of intrusion detection mechanisms, virus and malware protection mechanisms, URL (Uniform Resource Locator) or domain to IP address mapping verification, and the like. In at least some embodiments, the SMES may also be configured to perform correlation analysis, e.g., by determining whether statistically significant correlations exist between specific types of security problems (such as key vulnerability or successful network intrusions) and the environments in which the problems were found (e.g., the vendors providing security mechanisms or objects found to be problematic, the geographical or network locations at which the problems may tend to cluster, the types of applications/operating systems involved, and so on). Correlation analysis on a large scale may be possible in such embodiments using the extensive computing and/or storage resources of the provider network, and the large numbers of clients on whose behalf security mechanisms are being evaluated. The results of such correlation analysis may improve over time as more data is collected by the SMES, and may be used to more quickly identify the causes of the problems, as well as to help clients make better-informed choices for their security mechanisms. Clients of the service may typically communicate with the SMES via one or more endpoints (such as web sites) set up using resources of the provider network, e.g., to transmit requests for evaluating certificates, keys or entities, to submit reports of security problems encountered, to receive evaluation responses, and so forth. Various combinations of compute, storage and networking resources of the provider network may be selected and employed (e.g., by one or more SMES coordinators) to respond to the clients' evaluation requests and/or to build databases of evaluation results over time in different embodiments, as described below in further detail.

According to one embodiment, a system for implementing the SMES may comprise one or more computing devices. The devices may define and/or implement a number of programmatic interfaces enabling a client of the SMES to submit an evaluation request for one or more security mechanisms. An evaluation request may include a parameter or an indication that is usable by the service to determine resources (e.g., what kinds of resources, how many resources, and/or which specific resources) of the provider network are to be deployed for evaluating the security mechanisms in at least some embodiments. The evaluation request may specify various types of security mechanisms for evaluation in various implementations, including for example mechanisms that rely on public-key encryption, and may specify the granularity at which the evaluation is to be performed—e.g., whether a single digital certificate or key is to be evaluated, or whether a set of sources or certifiers of digital certificates is to be evaluated over a period of time. In accordance with an evaluation request received on behalf of a client via a one of the programmatic interfaces, where the evaluation request indicates a particular security mechanism using public-key encryption, the computing devices implementing the service may identify one or more resources based on a parameter of the request. Using the one or more resources, in one embodiment the service may obtain one or more of: (a) a trustworthiness indicator for a certificate authority that issued a public-key certificate in accordance with the particular security mechanism; (b) a result of a syntax analysis of a public-key certificate; or a (c) a vulnerability indicator for a key pair used in accordance with the particular security mechanism. In some embodiments, additional aspects of the certificate may also be examined. For example, in one embodiment a given certificate may include one or more URLs and/or domain names (e.g., one or more URLs or domain names for the subject or entity on whose behalf the certificate is generated). In order to communicate with the entities indicated by the URLs or domain names, the corresponding IP (Internet Protocol) addresses have to be determined, typically using DNS (Domain Name System) servers. If a DNS server is successfully attacked, the mappings of URLs/domains to IP addresses provided by that DNS server may be corrupted, potentially allowing sensitive data to be transmitted to destinations other than the intended destinations. In some embodiments, the SMES may accordingly submit multiple DNS requests to respective (different) DNS servers, and compare the IP addresses (or IP address ranges) obtained to ensure that they match, or are within an acceptable range of IP addresses advertised by the corresponding domain name owner. Such operations to check IP address mappings corresponding to URLs or domain names included in digital certificates may be termed "IP address mapping verification" herein. An evaluation response may be provided to the client, comprising for example a summary score indicating the evaluated quality of the security being provided, or the detailed results obtained during various portions of the security mechanism analysis.

In at least some embodiments, some of the analysis (such as various mathematical operations performed for key vulnerability analysis) required for security mechanism evaluation may be fairly computationally intensive and/or storage intensive. Several different approaches may be used to determine which specific resources of the provider network are to be used for the evaluation in various embodiments. For example, in one embodiment, an explicit or implicit parameter of the evaluation request may be used to determine a limit or upper bound on the amount of computational capacity and/or storage capacity to be used, and compute or storage resources available in the provider network (e.g., resources not currently being used for other purposes) may be selected accordingly. For example, in one embodiment a client may specify time constraints for analysis, such as the logical equivalent of "Please analyze this certificate within the next five minutes", and the service may identify appropriate compute and/or storage resources based on the constraints. The service may in some embodiments be able to make intelligent tradeoffs between compute resources and storage (e.g., storage used for intermediate results of key vulnerability analysis computations as described below) based on the parameters or constraints indicated by the client. In another embodiment, clients may indicate cost limits or budget limits for the requested evaluations, and the service may identify resources based on the budget limits, e.g., by selecting resources from a pool of dynamically-priced compute resources and using them until either the budget is exhausted or the evaluation is complete. In some embodiments, the determination of the resources may be made by the service based simply on identification information of the client (e.g., using the IP address from which the evaluation request originates, or a client identifier that is automatically included in the request) without using other parameters of the evaluation requests.

According to some embodiments, the SMES may include a database of security evaluation data. The database may include, for example, representations of previously-evaluated digital certificates and/or keys, records of information about certificate authorities, final results and/or intermediate results of previous key vulnerability analyses, security reports provided to clients, and/or SMES client preferences and settings. The records about certificate authorities may include, for example, certificate revocation history associated with respective authorities identified in the records, certificate syntax error history associated with the authorities, and/or client reports about their experiences with the authorities. Certificate revocation history information may be obtained from a variety of sources in different embodiments, such as certificate revocation lists (CRLs) obtained upon request from the authorities themselves, certificate revocation status obtained using the online certificate status protocol (OCSP), and/or client reports about revoked certificates. The database may grow over time, for example as new keys and/or certificates submitted for evaluation are added with the clients' consent. Thus, as the database grows, the quality of the analyses provided by the service may increase as well, since at least some of the results (such as CA trustworthiness scores) provided by the service may become more representative or more accurate as additional data on the evaluated entities becomes available.

As indicated above, some of the computations performed for evaluating security mechanisms may be computationally intensive in at least some embodiments. Several different types of cryptographic algorithms may be employed in different mechanisms for public-key encryption, such as the RSA algorithm (named for its developers Rivest, Shamir, and Adleman) or the DSA (Digital Signature Algorithm), a United States federal government standard for digital signatures. The computations involved may vary based on the algorithm. In the RSA algorithm, for example, a public key consists of two integers: an exponent e and a modulus M, where the modulus is a product of two randomly chosen prime numbers p and q. The private key d corresponding to the public key (e, M) can be obtained using the formula "$d=e^{-1} \mod((p-1)/(q-1))$". Thus, the private key can be obtained, and the security being provided by a given key-pair obtained via the RSA mechanism can be breached, if the factors p and q can be determined. In general, it is hard to factorize a sufficiently long modulus (a typical modulus may comprise 1024 bits in many common security protocols). In contrast, it may take less effort to compute the greatest common divisor (GCD) of two 1024-bit integers. This leads to the potential vulnerability: If an attacker can find two distinct RSA moduli M1 and M2 that share a prime factor p but have different second prime factors q1 and q2, and then computes p as the GCD of M1 and M2, the attacker can then easily compute q1 and q2 and hence obtain the private key for the public keys corresponding to both moduli M1 and M2. Thus, to determine whether a private key can be deduced for a corresponding public key, in some embodiments, a set of greatest-common-divisor (GCD) computations may be performed—e.g., GCDs of various pairs of module for different public keys may be determined to identify common prime factors. In some implementations, the GCD computations performed by the service may comprise a number of steps with respective intermediate results that may be useful in subsequent GCD computations. For example, in one approach, given a number of moduli corresponding to different public RSA keys collected or obtained by the SMES, a binary tree of moduli products (called a product tree) may be constructed, and then a tree or remainders of the product tree nodes modulo various integers (called a remainder tree) may be computed, finally obtaining a GCD of each modulus with the product of all the other moduli. For DSA, the mathematics is somewhat different, and involves the use of a randomly chosen ephemeral key. DSA algorithms are vulnerable if the ephemeral key is selected using insufficiently strong entropy (i.e., using a random number generator of poor quality), or if the same ephemeral key is selected for different signatures. If a DSA ephemeral key is known, then the private DSA key can be computed from a DSA signature and the public key. DSA techniques can thus be attacked by identifying common ephemeral keys, for example, which may also be computationally intensive in at least some scenarios. Vulnerability analysis of other cryptographic mechanisms used in various protocols may also, in general, require substantial computational effort, often involving factorization operations. Composite number checking (i.e., checking whether a number is prime or not), and/or operating system-dependent moduli checking (e.g., checking the /etc/moduli file in certain types of Unix-based systems) may also or instead be performed as part of the vulnerability analysis in some embodiments.

In some embodiments in which GCD computations or other factorization computations are performed, as indicated above, intermediate results (such as product trees and/or remainder trees) of previously-performed computations may be useful in optimizing new computations (e.g., in reducing the computational cycles needed in subsequent vulnerability analyses). Depending on various factors such as client resource constraints or service budget limits, such intermediate results may be stored at least temporarily by the SMES using persistent storage devices of the provider network in some such embodiments. Similar space-versus-computation optimizations may be implemented for other types of computations (i.e., non-GCD computations) involved in vulnerability analysis as well, in various embodiments.

In at least one embodiment, the SMES may support a subscription model, allowing clients to obtain evaluations of security mechanisms on an ongoing basis. For example, a client may specify (a) a set of its physical or virtual hosts that may participate in public-key encryption based security protocols (b) a subscription period and/or (c) resource or budget limits, and the service may then evaluate the certificates used for interactions performed using those hosts over the subscription period, subject to the resource or budget limits, and provide one or more evaluation reports to the client for the subscription period. Similarly, in one embodiment, a client may specify a set of targets (such as a set of CAs, or TLS/SSL/SSH hosts) for evaluation over a subscription period, and the service may attempt to obtain and evaluate keys and/or certificates issued by the specified targets over the subscription period and provide the results of the evaluations to the client.

In some embodiments, either in response to specific evaluation requests or as part of a subscription, the SMES may provide a summary score (e.g., on a scale of 1 to 100, with 100 indicating "extremely secure" and 1 indicating "very insecure") indicative of a quality of a given security mechanism or a given entity involved in implementing a security mechanism. Such summary scores may serve as easy-to-use guidelines to clients that wish to choose among alternative mechanisms, TLS/SSH hosts, certificate authorities, or security-related products or vendors. The summary score may be determined by combining the results of specific evaluation and analysis in some embodiments, e.g., by attaching weights to different aspects of the analyses, with the weights being adjusted over time based on feedback about earlier summary scores and/or based on newly-gathered evaluation results.

According to some embodiments, a plurality of pricing policies may be supported for providing security mechanism evaluations. For example, one simple pricing policy may cover single digital certificate evaluations. Another pricing policy may cover subscriptions, parameterized by the number of hosts or evaluation targets. Some pricing policies may take into account resource usage (e.g., how many CPU-seconds were used for vulnerability analysis). Programmatic interfaces may be provided to allow clients to select from among available pricing policies in some embodiments, and the billing amounts for security mechanism evaluations may be determined based on the policies selected using such interfaces.

In one embodiment, key generators or certificate authorities themselves may utilize the SMES, e.g., they may request the service to evaluate the vulnerability of evaluation of proposed keys. The service may perform various computations (e.g., duplicate key use checks, GCD computations, moduli checks, small prime factors checks etc.) on the proposed keys, and provide evaluations of the quality of the keys back to the requesters. Thus, key-issuing entities may be able to enhance the quality of their keys over time, thereby potentially preventing security breaches that could otherwise have occurred due to insecure key pairs.

System Providing Security Mechanism Evaluation Service

FIG. 1 illustrates an example system environment, according to at least some embodiments. As shown, system 100 may include a provider network 102 set up to support a plurality of services for various clients, including a security mechanism evaluation service. The provider network 102 may include a variety of physical and logical resources (e.g., compute resources 160A, 160B, 160C and 160D, and storage resources 165A, 165B, 165C and 165D) distributed across one or more data centers. SMES coordinator 180, which may be referred to herein simply as the coordinator 180, may be responsible for managing and implementing the evaluation of various types of security mechanisms on behalf of various clients 122, such as client 122A, 122B and 122C. In some implementations components of the coordinator may be distributed among a plurality of computing devices at one or more data centers of the provider network.

In the depicted embodiment, a compute pool 133 of a subset of the compute resources of the provider network 102 and a storage pool 134 of a subset of the storage resources of the provider network 102 are shown as currently assigned for the SMES. The constituents of the assigned compute pool 133 and/or the assigned storage pool 134 may change dynamically, e.g., based on factors such as the utilization levels of provider network resources, the demand for security evaluation-related computations and storage, or the resource limits or preferences indicated by clients 122. In at least some embodiments, different clients 122 may have respective compute pools and/or storage pools allocated or reserved exclusively for their own security evaluation related needs. In some embodiments, the resources available for security mechanism evaluation by the SMES may include one or more long-term dedicated resource pools allocated to the service, as well as resource contributions dynamically added from client-owned resource sets or resources added in response to peaks in the workload of the service.

As shown, one or more SMES endpoints 185 (such as endpoint 185A or 185B) may be established for communications between the coordinator 180 and clients 122 in some embodiments. An SMES endpoint 185 may, for example, comprise a hardware/software component, a computing device, or a server with a URL or network address that is accessible to clients outside and/or within the provider network. Several different SMES endpoints may be set up across the various data centers of the provider network, for availability/redundancy reasons and/or or to support faster access to geographically distributed clients at various locations. An SMES endpoint 185 may support various programmatic interfaces (e.g., interfaces defined by the SMES coordinator), enabling clients to submit evaluation requests, subscription requests, and the like, and/or for clients to receive responses to their requests. When a request from a client is received, an SMES endpoint 185 may parse the incoming request and, depending for example on the nature or contents of the client request, pass on a corresponding internal request to one or more other components of the service, such as the coordinator 180. The endpoint 185 may receive a response to the internal request (e.g., from the component to which it sent the internal request), generate a corresponding outgoing response for the client, and transmit the outgoing response to the client in accordance with the appropriate programmatic interface and/or the formatting preferences of the client. In one embodiment, some types of security evaluation results (such as trustworthiness indications of various CAs) may be cached at an SMES endpoint, and as a result the endpoint may be able to respond to some client requests without involving any other components of the service. In at least some embodiments, an SMES endpoint 185 may be responsible for obtaining information from or about various evaluation targets 190 (such as targets 190A or 190B), such as one or more certificate authorities (CAs), TLS hosts or SSH hosts. For example, a client may identify a particular CA as a target 190 to be evaluated, and an SMES endpoint 185 may be designated to obtain a certificate or a key certified by the target 190, or to obtain revocation lists or revocation history information from or about the target. In at least one embodiment, one or more of the clients 122 (e.g., client 122C in the depicted embodiment) of the SMES may comprise a certificate authority—e.g., a CA that would like an analysis of a proposed key to be performed using the resources of the SMES. Such a client may, for example, submit the proposed key to an SMES endpoint and eventually obtain a vulnerability or quality analysis of the key from the SMES, based on computations performed by internal components of the service using resources of pools 133 and/or 134. Various types of public key-generating entities or devices may also use the SMES to check the quality of proposed keys, potentially rejecting proposed keys found vulnerable, and thereby increasing the quality of their keys over time. In some embodiments, the SMES coordinator 180 may itself serve as an endpoint, and separate endpoints 185 may not be implemented.

In at least some embodiments, a portion of the storage resources assigned to the service may be used for a persistent store or database of security-related information, as described below in conjunction with the description of FIG. 2. Generally speaking, the coordinator 180 may be responsible for determining (e.g., based on explicit or implicit parameters of client requests) the set of resources that is to be used to generate responses to client requests, or for ongoing evaluation based on client subscriptions. For example, the coordinator may manage the set of compute resources 160 to be used for key vulnerability, and the storage to be used to contain temporary results of key vulnerability analysis as well as the database of security information. The coordinator may also be responsible for directing SMES endpoints 185 to obtain information (such as certificates, revocation lists and the like) from various targets 190, e.g., based on the received requests or ongoing subscriptions. In some embodiments, the coordinator may also be configured to perform syntax analysis, sanity checking, or content verification (e.g., by requesting the same type of certificate from multiple sources and ensuring that at least some subset of the fields are identical independent of the source) of the fields of various digital certificates, while in other embodiments such lightweight tasks may be delegated to SMES endpoints or other subcomponents. In one embodiment, clients may request the SMES to attempt to breach security mechanisms set up at client networks or devices, such as intrusion detection mechanisms, e.g., to test the strength of the security mechanisms via simulated attacks without actually causing any damage. In response to such requests, the coordinator may designate one or more SMES endpoints to perform the requested simulated attacks, and may provide an evaluation of the strength or weakness of the targeted security mechanism to the client depending upon the results.

SMES Components

Figure 2:
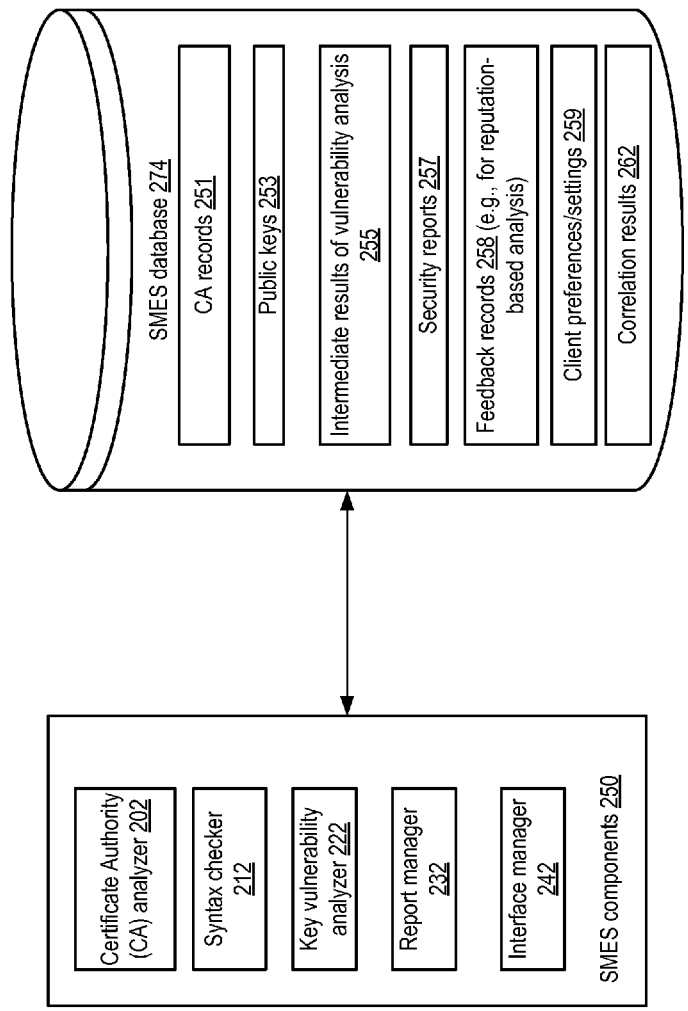
FIG. 2 illustrates example constituent components of a security mechanism evaluation service, according to at least some embodiments.

FIG. 2 illustrates example constituent components 250 of a security evaluation service, according to at least some embodiments. The coordinator 180 may include some or all of the depicted components 250 in one embodiment, while in other embodiments some of the components may be included in the SMES endpoints 185 and/or other devices used for the SMES. As shown, components 250 may include a certificate authority (CA) analyzer 202, a certificate syntax checker 212, a key vulnerability analyzer 222, a report manager 232, and an interface manager 242. Additional components may be implemented in some embodiments, such as attack simulators capable of attempting to breach security mechanisms that clients wish to test. In different embodiments, some of the components shown in FIG. 2 may not be implemented. Multiple replicas or instances of various components may be instantiated in at least some embodiments. Each component may comprise any combination of software and/or hardware elements in various embodiments.

CA analyzer 202 may be configured to obtain and/or examine information on specific CAs involved in providing/certifying digital certificates to clients of the service in the depicted embodiment. Such information may include, for example, the number of times invalid or erroneous certificates were provided by a given CA, the number of times weak keys were found to be associated with the given CA or certificates with known weak encryption algorithms were provided, the number of certificate revocations associated with a given CA and the reasons for the revocation (such as compromised certificates or keys), costs of purchasing certificates from the CA, and so on. Revocation information may be obtained using a variety of approaches in different embodiments, such as by requests for certificate revocation lists (CRLs), requests submitted via OCSP (online certificate status protocol), or via client-submitted reports of certificate revocations. The CA analyzer 202 may be responsible for maintaining a collection of CA records 251 in the SMES database 274 in the depicted embodiment. Each CA record 251 may include the information collected about a given CA. The CA records may be used to determine trustworthiness indicators for different CAs, and/or to rank the CAs relative to each other. CA trustworthiness may be indicated using numerical scores and/or classifying CAs into groups (such as "Highly trustworthy", "Moderately trustworthy" or "Less trustworthy") in different implementations. In some embodiments, records may also be maintained for various protocol hosts providing TLS/SSL/SSH implementations, with various types of data for each (host, protocol) combination, such as how often duplicate keys were issued, or vulnerable keys were issued.

Syntax checkers 212 may be used to analyze the contents of digital certificates submitted for evaluation by clients, or obtained from evaluation targets 190 in some embodiments. The syntax of a given certificate may be checked against the corresponding standard specification, such as the X.509 standard. In addition to straightforward checks that may verify that appropriate field names and delimiters are used in the certificates and field size limits are adhered to, other sanity checks may also be performed by syntax checkers 212, such as verifying that the validity dates, subject identification information such as email addresses and other fields make sense. Results of the syntax checks may be used to modify CA records 251 as needed—e.g., if evidence of malformed or corrupted certificates is found during syntax analysis of a certificate from a given CA, its CA record may be modified to reflect the evidence.

Key vulnerability analyzer 222 may be responsible for computations, such as greatest-common-divisor (GCD) computations, factorizations, and the like, that may be used to determine the weakness or strength of key pairs (e.g., how hard or easy it is to determine a private key from a public key). Intermediate results 255 of such computations (such as product trees or remainder trees in the case of certain kinds of GCD computations) may be stored by the key vulnerability analyzer 222 using available storage space (e.g., based on client-specified preferences or limits) in the SMES database 274 in some implementations. For example, as the service builds up a collection of keys over time, it may perform GCD and/or other computations for at least some of the keys it has collected, and store intermediate results of those computations. Such intermediate results may be useful in optimizing future GCD computations that may also need to compute similar intermediate results, thus trading off storage space for computation effort.

Report manager 232 may be responsible for generating security evaluation reports 257 in desired formats for the clients of the service, e.g., in response to one-time requests such as certificate evaluation requests or key vulnerability evaluation requests, or for ongoing evaluations based on client subscriptions. The reports themselves may also be stored within the SMES database. Interface manager 242 may be configured to implement various programmatic interfaces used by the service, e.g., interfaces such as APIs or web pages that clients may use to interact with the SMES endpoints, as well as internal interfaces that may be used by coordinator 180 or SMES endpoints but may not be exposed to clients. In at least some embodiments, the SMES database 274 may include feedback records 258 from clients regarding various security service providers, certificate authorities and the like, which may be used to provide reputation-based analysis of the providers and certificate authorities. In one such embodiment, the SMES may encourage various clients to submit feedback with their own ranking, rating and/or detailed comments regarding the quality and efficacy of the security provided by vendors and certificate authorities. The resultant feedback database may be analyzed by the SMES to, for example, determine changes to vendor reputation or CA reputation over time, and at least a portion of such analysis may be made available to various SMES clients. In one embodiment, as mentioned earlier, the SMES may be configured to perform correlation analysis on different instances of security shortcomings or breaches, and store the results 262 of the correlation analysis in the database 274 as well. Because the SMES may be configured to collect security-related information from a wide variety of sources, it may be possible in such an embodiment to detect correlations between frequent occurrences of specific types of problems (e.g., poor key generation or successful network intrusion) on the one hand, and factors such as the types of applications running when the security problem occurred, geographical regions, operating systems, security service vendors, network device vendors, individual CAs or CA chains, and the like. The large number of different types of security mechanisms the SMES evaluates, the large number of clients/users with which it interacts, and/or the substantial amount compute and storage resources available to the SMES in some embodiments in a provider network environment, may all help the SMES to detect security-related correlations that may otherwise be difficult to identify (especially by security vendors that may specialize in just one or a few types of mechanisms). The SMES database 274 may also be used to store client-related metadata such as client preferences and settings 259 in some embodiments. The data shown in SMES database 274 may be distributed across multiple storage devices or containers in some embodiments.

Client Interactions

Figure 3:
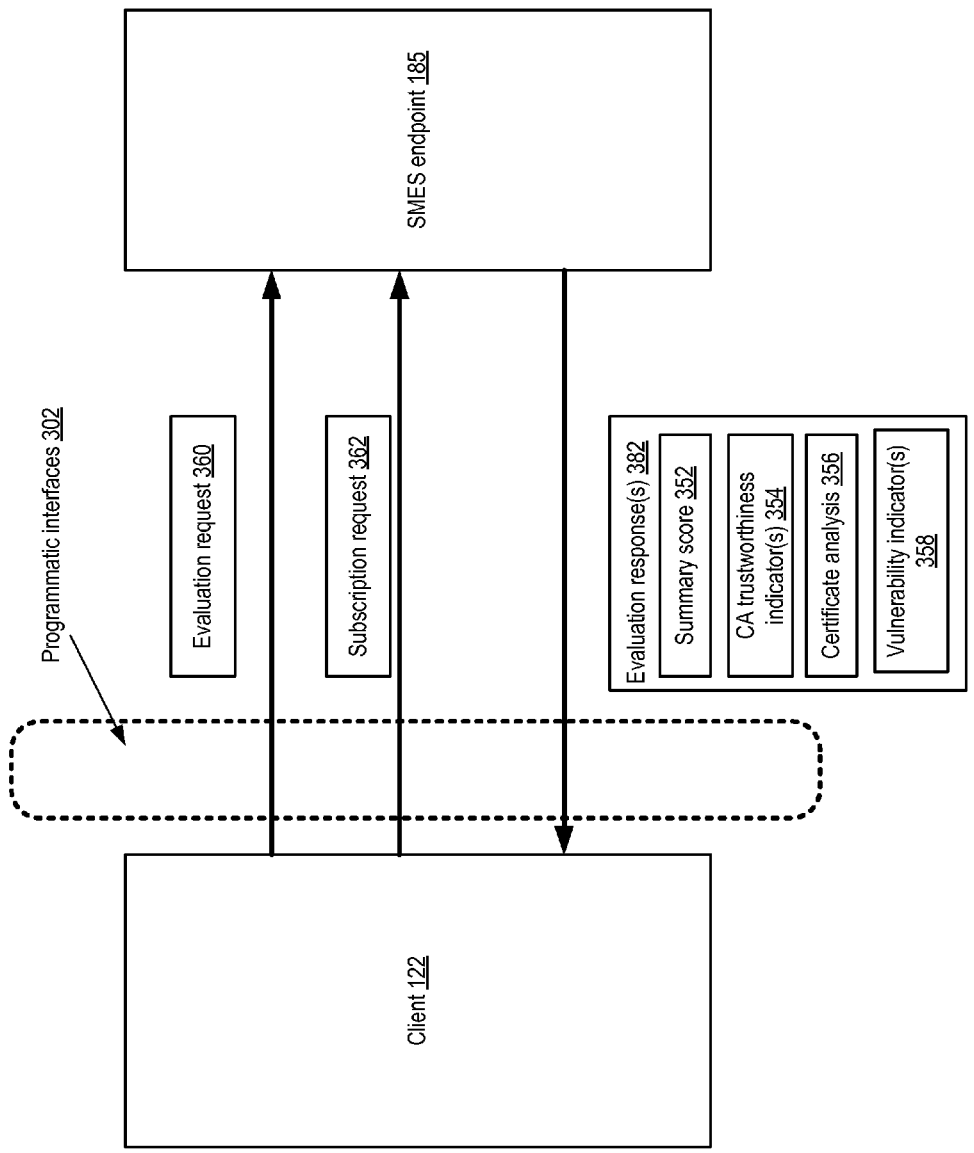
FIG. 3 illustrates example programmatic interactions between clients and a security mechanism evaluation service endpoint, according to at least some embodiments.

FIG. 3 illustrates example programmatic interactions between clients and an SMES endpoint 185, according to at least some embodiments. As shown, a client 122 may submit at least two types of requests to the SMES endpoint 185 via one or more programmatic interfaces 302 provided by the service. A client may for example submit a one-time evaluation request 360, or a longer-term subscription request 362. An evaluation request may for example indicate a particular public-key-based certificate, a certificate authority, or a key, that is to be evaluated on behalf of the client 122. A subscription request 362 may indicate a subscription period during which specified security mechanisms or entities are to be evaluated by the service.

Depending on the type and details of the request, the SMES endpoint 185 may transmit corresponding internal requests to the coordinator 180, and eventually receive corresponding responses from the coordinator. In at least some embodiments, one or more parameters associated with the client's request 360 or 362, usable to determine the set of resources of the provider network to be used to generate the responses, may be passed along to the coordinator. After an internal response is received at the endpoint from the coordinator, the endpoint 185 may then prepare an evaluation response 382, e.g., in a format indicated by the client, and provide the evaluation response to the client via one of the programmatic interfaces 302. The evaluation response 382 may include any combination of such elements as a summary score 352 (e.g. an overall security quality score on a scale of 1-100) of a specified mechanism or entity, CA trustworthiness indicator(s) 354, certificate analysis 356 such as syntax analysis of a specified certificate, or certificates, and/or vulnerability indicators 358 for keys. In some implementations, for subscribing clients, a series of such evaluation responses or reports may be prepared over time and provided periodically with the latest evaluation results available, or with evaluation results accumulated during the subscription period.

As shown in FIG. 3, the SMES may implement one or more programmatic interfaces, such as application programming interfaces, web pages or web sites, command-line tools, or graphical user interfaces, to support interactions with clients. FIG. 4 illustrates an example web-based interface enabling a client of a security mechanism evaluation service to specify security evaluation preferences and settings, according to at least some embodiments. As shown, the web-based interface may comprise a web page 400 with a message area 403 and a number of form fields 471. Default values may be filled in by the service for at least some of the form fields, so that clients may only have to enter information if they wish to change the default settings. Clickable links may be provided to allow clients to specify non-default values for the fields.

In the depicted embodiment, the web page 400 may include field 405 showing the client identifier and/or client name of the entity that is to be billed for the security mechanism evaluations. Field 407 may indicate the service usage type (e.g., whether only one-time evaluation requests are to be supported, or a subscription model is to be used, and if so the duration of the subscription). Field 409 may be used to specify the kinds of security mechanisms to be evaluated, such as, for example, the default of X.409 digital certificate-based public-key encryption schemes.

For any given type of security mechanism, the service may support one or more evaluation or analysis types: e.g., for X.409-based schemes, the analysis types supported may include key vulnerability analysis, certificate syntax analysis/sanity checking, and/or certificate authority trustworthiness analysis. At least some of the types of analysis (such as key vulnerability analysis using factorization/GCD algorithms) may involve substantial computations, and as a consequence may be priced higher than less intensive analysis types (such as syntax/sanity checks). Clients may change the types of analysis they want in the depicted embodiment using field 411. By default, as shown in field 411, a "Deep" level of analysis may be enabled, comprising key vulnerability analysis, certificate content checks (e.g., syntax checks, sanity checks, duplication checks) and reputation-based analysis (which may include examining feedback records from other clients regarding the certificate authority). However, if a client wishes to restrict the types of analysis/evaluation, e.g., to a "Basic" level comprising just syntax analysis and sanity checks, the client may modify the setting shown in field 411 using the provided link labeled "click here to change". For security mechanisms involving digital certificates, a field such as 413 may be provided in some embodiments to allow clients to indicate whether they wish to upload the certificates to be evaluated, or whether the service should obtain the certificates—e.g., whether a push model or a pull model should be used to obtain the certificates.

In at least some embodiments, a plurality of pricing policies may be supported for the SMES, and clients may be able to select the appropriate pricing policy via a programmatic interface. In the embodiment shown in FIG. 4, the pricing policy to be used may be selected via form field 415. In the case of a subscription model for certificate-based security mechanism evaluation, for example, one pricing policy may include a flat up-front subscription fee plus a per-certificate charge. Pricing policy options provided to a client may be dependent on the analysis types desired by the client (e.g., pricing may be higher for "Deep" analysis than for "Basic" analysis) in at least some embodiments, and/or on other constraints or preferences indicated by the client (e.g., using timing constraints specified using field 417). Other pricing policies may include, for example, reductions or discounts based on the size of the client's fleet of provider network resources (e.g., large clients that already pay a substantial amount for other services may be given a discount for security mechanism analysis), or policies with billing amounts dependent on measures of the resources used for the evaluations on behalf of the client, and so on. Pricing policies may be tied to the manner in which resources are allocated for security mechanism evaluations in at least some embodiments. For example, in some embodiments, a pricing policy may allow the client to reserve computing capacity and/or storage for security mechanism evaluations, while according to other pricing policies resources may be allocated as needed (e.g., using on-demand resource allocation for a fixed price per resource unit, or spot-market dynamic pricing of resources). Clients may be able to specify certain types of constraints (such as timing constraints indicating how fast analysis should be completed) programmatically in some embodiments, e.g., using field 417 of the web page 400, which may be used by the SMES to determine how many (and what types of) resources are to be deployed on behalf of the client. Client-specified timing constraints (such as the equivalent of "I want a given certificate to be analyzed in no more than five minutes") may help the SMES determine appropriate tradeoffs between computation and storage in at least some embodiments—e.g., the extent to which stored intermediate results of previous computations should be used to speed up GCD computations for a given analysis. that.

A client may also be able to indicate formatting preferences for the analysis results or reports, e.g., using field 419 to specify that results formatted according to HTML (HyperText Markup Language) are acceptable. Additional customizations may be performed by clicking on link 421, and the preferences may be submitted to the service using button 490 in the depicted embodiment. Additional interfaces may be provided to allow clients to submit certificates or to specify evaluation targets 190 such as certificate authorities to the service in the depicted embodiment. Other types of programmatic interfaces may be used in different embodiments (e.g., APIs, command-line tools, or graphical user interfaces), and not all the types of information shown in FIG. 4 may be specified programmatically in other embodiments.

Methods for Providing Security Mechanism Evaluation Service

Figure 5:
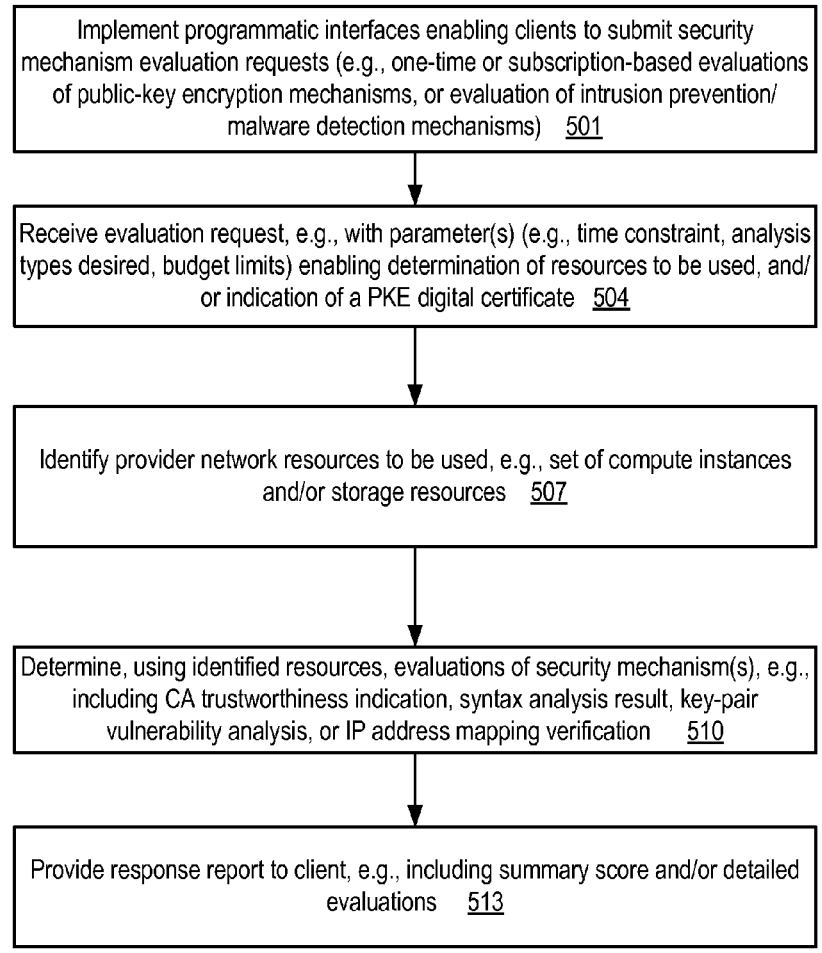
FIG. 5 is a flow diagram illustrating aspects of operations that may be performed to implement a security mechanism evaluation service, according to at least some embodiments.

FIG. 5 is a flow diagram illustrating aspects of operations that may be performed to implement a security evaluation service, according to at least some embodiments. As shown in element 501, one or more programmatic interfaces (e.g., APIs or web-based interfaces) may be implemented to enable clients to submit requests to evaluate security mechanisms. Clients may specify one-time evaluation requests for a given certificate, key or certificate authority, or may be able to request subscriptions for a specified term during which evaluations may be performed on an ongoing basis as needed. Various types of mechanisms may be evaluated depending on the client's needs in some embodiments, such as X.409 or other digital certificate-based public key encryption mechanisms, intrusion detection mechanisms, or malware detection mechanisms. The service may receive (e.g., via one of the SMES endpoints 185) an evaluation request specifying at least one digital certificate to be evaluated (element 504). In at least some embodiments, the evaluation request may include an explicit or implicit parameter that can be used to determine the provider network resources to be used for the evaluation—e.g., in various implementations, a client may indicate a time limit or a cost limit, or a service-level agreement associated with the request may indicate the types of resources to be used. In some implementations a client-specified time limit or cost limit may be used by the service to determine an upper bound on compute resources (e.g., no more than X CPU-minutes are to be used) and/or storage resources (e.g., no more than Y gigabytes of memory and/or disk storage are to be used). Client-specified requirements or constraints may be used by the service to make tradeoffs between different resource types —e.g., compute resources versus storage/memory resources in at least some embodiments.

Having received the request, the service may identify the specific resources to be used for the client's request (element 507), such as some set of compute and/or storage resources of the provider network. As shown in element 510, the service may then proceed to perform the computations necessary for the requested evaluation using the identified set of resources. For example, for digital certificate mechanisms, in the depicted embodiment the service may determine one or more of: (a) key vulnerability analysis (b) CA trustworthiness determination (c) certificate syntax analysis/sanity checks or (d) IP address mapping verification (e.g., validating, using multiple DNS servers, the IP addresses to which domain names or URLs included in the certificates are mapped, as described above). The results of the analysis may then be provided to the client, e.g., in a format indicated by the client via one of the programmatic interfaces (element 513). In at least some implementations, the results may include a summary score (such as a score on a scale of 1 to 100, in which 100 indicates extremely high quality of security, while 1 indicates poor security) and/or details of the different types of evaluations/analyses performed.

Figure 6:
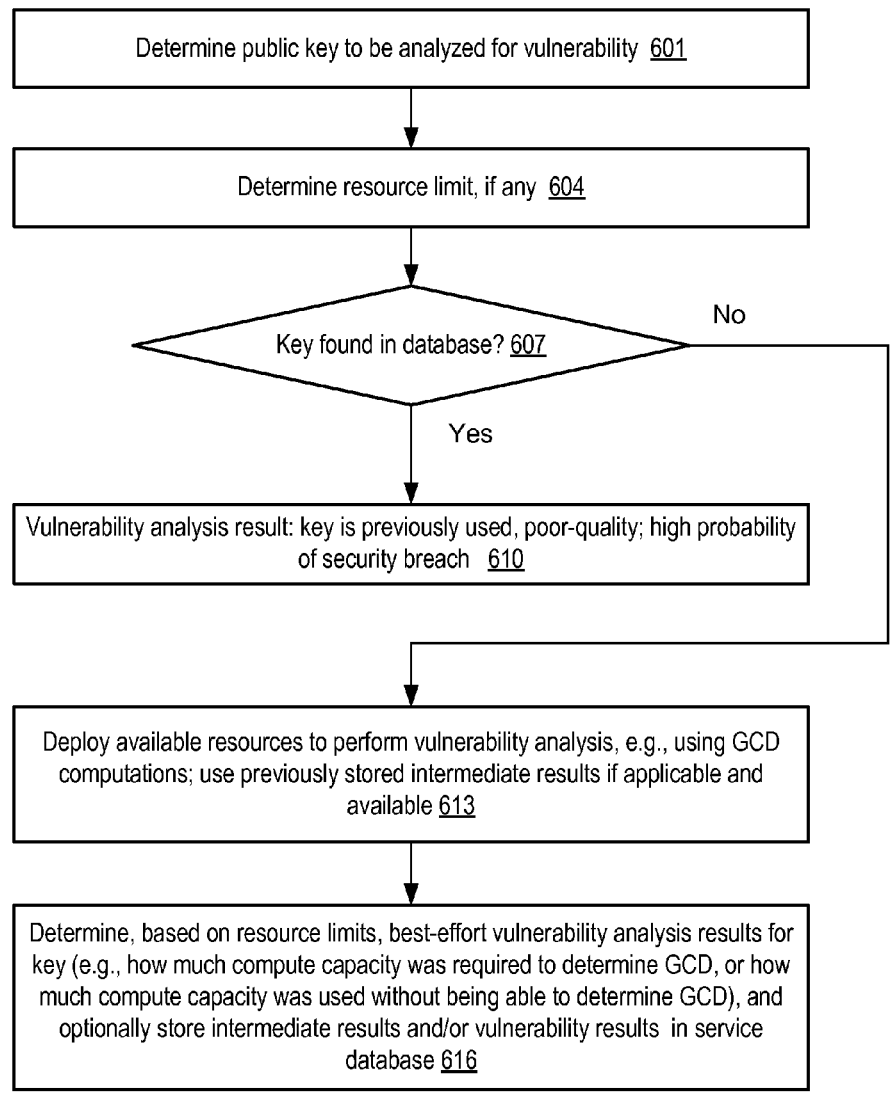
FIG. 6 is a flow diagram illustrating aspects of operations that may be performed to evaluate key vulnerability, according to at least some embodiments.

FIG. 6 is a flow diagram illustrating aspects of operations that may be performed by the SMES to evaluate key vulnerability, according to at least some embodiments. As shown in element 601, the service may determine, for analysis, a public key to be used in a security mechanism, such as an RSA public key with a specified modulus and exponent as described earlier. The key may be specified by a client, either directly or as part of the contents of a digital certificate specified by the client in some embodiments. In other embodiments the service may itself obtain the key from a target of evaluation such as a CA. The service coordinator 180 may determine any resource limits to be applied to the key evaluation (element 604), e.g., based on the client's request parameters (such as time constraints by which results are to be provided), client preferences or service agreement.

The service may determine whether the key is already in the SMES database 253 (element 607). If the key is already in the database, i.e., if the key has been issued before, the SMES may determine that the key is of poor quality and that there is a relatively high probability of a security breach if the key is relied upon for security (element 610). This vulnerability analysis may then be provided to the client.

If the key is not in the database (as also determined in element 607), the SMES may then deploy the available resources (consistent with any limits/constraints determined in the operations shown in element 604) to perform the vulnerability analysis (element 613). For example, GCD computations may be performed, and any appropriate previously stored intermediate results of GCD analysis (such as product trees or remainder trees) may be used if available to optimize the computations. Any appropriate mathematical techniques may be used to try to determine the private key corresponding to the public key in various embodiments, including other types of factorization, use of the Euclidean or extended Euclidean algorithm, and the like.

The service may eventually conclude its computations, e.g., either because the computation results have been obtained, or because the resource limits have been reached. A best-effort vulnerability analysis result may then be generated (element 616) and provided to the client, e.g., indicating either that the private key corresponding to the public key has been determined using compute capacity X (e.g., in CPU-seconds) for GCD calculations, or that it was not possible to determine the private key while remaining within the specified resource constraints Y. Intermediate results of the analysis, such as product trees or remainder trees, may be stored, for example in the SMES database 274 in some embodiments.

Figure 7:
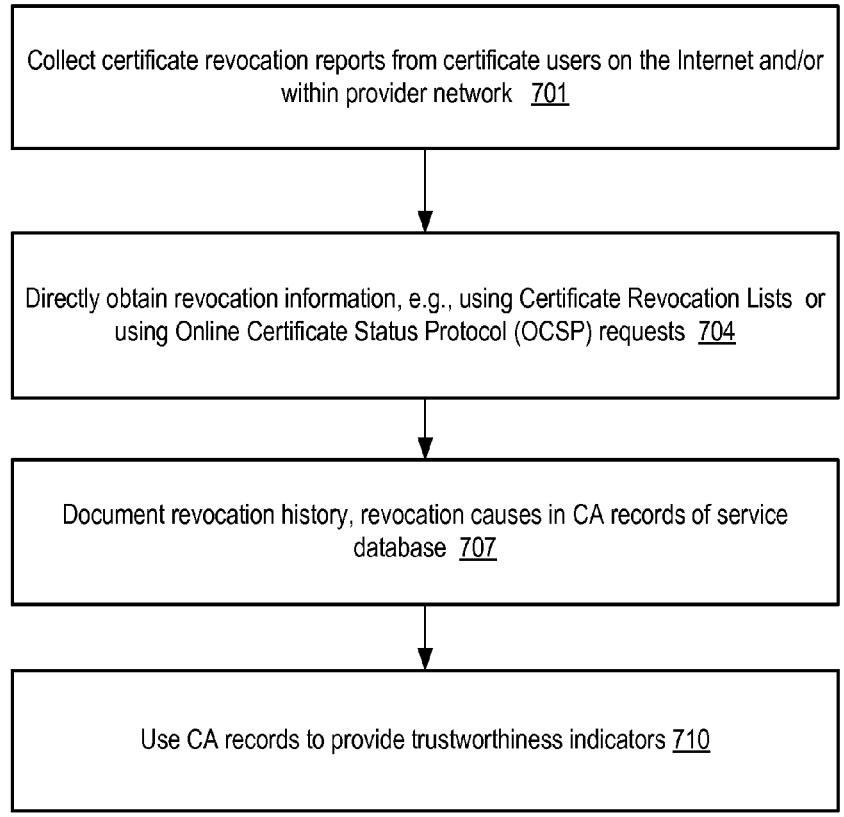
FIG. 7 is a flow diagram illustrating aspects of operations that may be performed to generate records for trustworthiness analysis of certificate authorities, according to at least some embodiments.

FIG. 7 is a flow diagram illustrating aspects of operations that may be performed to generate records for trustworthiness analysis of certificate authorities, according to at least some embodiments. As shown in element 701, the SMES may collect reports of certificate revocation from a variety of certificate users, e.g., from other clients of the provider network whose applications use digital certificates, and/or from users on the Internet. In some embodiments, a web page or another programmatic interface may be provided by the SMES for users to submit reports of certificates that have been revoked due to errors, malformed fields, or security compromises. The SMES may also or instead directly obtain revocation information from certificate authorities or other entities using the appropriate protocols or interfaces (element 704), e.g., by requesting certificate revocation lists, or using the online certificate status protocol (OCSP). Such queries may be issued based on a predetermined schedule (e.g., once a week) by the SMES in some embodiments, or the queries may be triggered by client requests—e.g., a given CA may be queried for its revocation history more frequently if more than one client indicates that the CA should be evaluated, while another CA that is rarely referred to in client requests may be queried infrequently. The revocation history, as well as the specific causes that led to certificates being revoked, may be documented in respective certificate authority records 251 for the various authorities in the SMES database (element 707). Over time, the database may grow, enabling the SMES to develop a fairly complete picture of the quality of certificates from different CAs and from different combinations of CAs (since a given digital certificate may typically be certified by a plurality of CAs in a "chain of trust"). The SMES may use the gradually evolving collection of CA records in its database to provide trustworthiness indicators of the CAs to clients (element 710).

Figure 8:
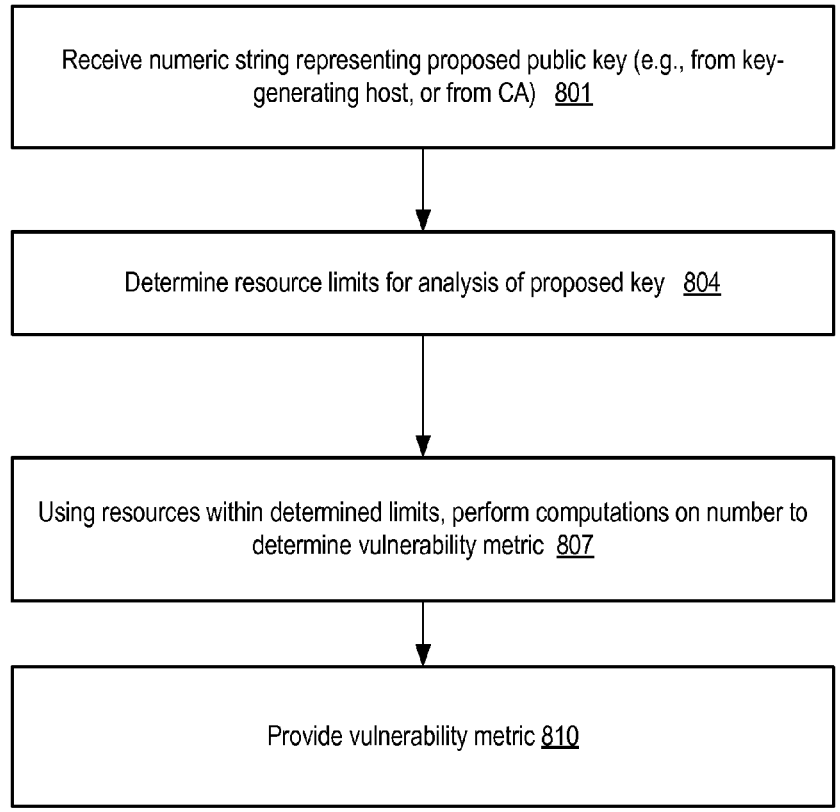
FIG. 8 is a flow diagram illustrating aspects of operations that may be performed to determine vulnerability metrics of a proposed key, according to at least some embodiments.

FIG. 8 is a flow diagram illustrating aspects of operations that may be performed to determine vulnerability metrics of a proposed key, according to at least some embodiments. In the depicted embodiment, a key-generating host or device, or a certificate authority, may act as a client of the SMES (such as client 122C of FIG. 1), and may submit a key to the SMES for evaluation prior to issuing or certifying the key for use. The SMES may receive a numeric string representing the proposed key (element 801). The coordinator 180 may determine the resource limits for analyzing the proposed key (element 804), e.g., based on a parameter of the request in which the key was submitted, or based on a subscription or service agreement with the CA or an operator of the key-generating device or host. Using resources within the limits, the SMES may then perform computations, such as checking whether the key already exists in the SMES database, as well as various types of GCD or factorization operations, to determine a vulnerability metric of the proposed key (element 807). The vulnerability metric may then be provided to the submitter of the proposed key (element 810).

It is noted that in various embodiments, the operations illustrated in the flow diagrams of FIG. 5, 6, 7 or 8 may be performed in a different order than that shown, or may be performed in parallel. In some embodiments some of the operations illustrated in FIG. 5-FIG. 8 may be omitted.

Use Cases

The techniques described above, of providing evaluations of various security mechanisms, may be useful in a variety of different scenarios. For example, many clients of digital certificate-based schemes may not typically even be aware of the contents of the certificates they use, or of the potential vulnerability of the schemes on which they rely for prevention of financial and/or information loss. For such clients, being able to sign on to a subscription-based service that is configurable to check various aspects of the security mechanisms may be well worth the costs. The ability to obtain trustworthiness reports and vulnerability analyses on an as-needed basis, or on a continuing basis, from a respected provider network may be helpful in selecting the set of security providers and certificate authorities for client applications. Key-generating entities may benefit from a third-party analysis of their proposed keys, and feedback from the SMES indicating that their proposed keys are vulnerable may be useful in enhancing their entropy sources so that the quality of their keys improves over time.

Illustrative Computer System

Figure 9:
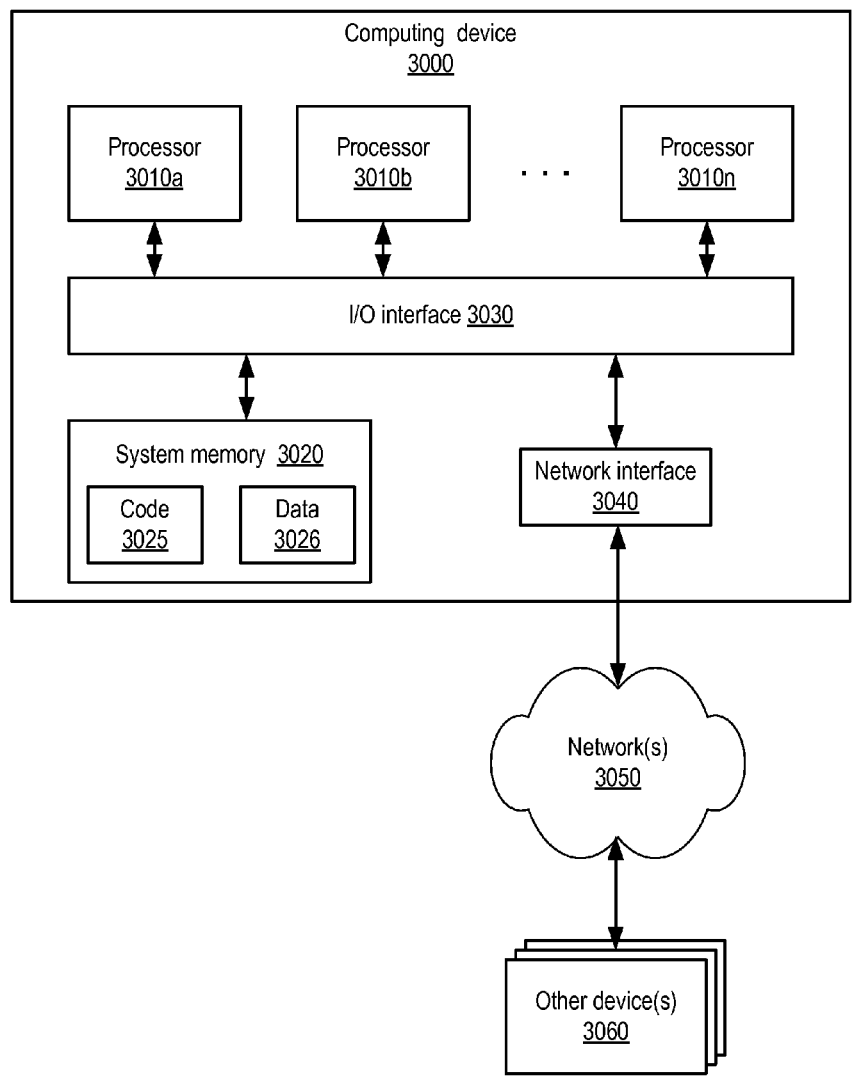
FIG. 9 is a block diagram illustrating an example computing device that may be used in at least some embodiments.

In at least some embodiments, a server that implements a portion or all of one or more of the technologies described herein, including the techniques to implement the various components of the SMES, may include a general-purpose computer system that includes or is configured to access one or more computer-accessible media. FIG. 9 illustrates such a general-purpose computing device 3000. In the illustrated embodiment, computing device 3000 includes one or more processors 3010 coupled to a system memory 3020 via an input/output (I/O) interface 3030. Computing device 3000 further includes a network interface 3040 coupled to I/O interface 3030.

In various embodiments, computing device 3000 may be a uniprocessor system including one processor 3010, or a multiprocessor system including several processors 3010 (e.g., two, four, eight, or another suitable number). Processors 3010 may be any suitable processors capable of executing instructions. For example, in various embodiments, processors 3010 may be general-purpose or embedded processors implementing any of a variety of instruction set architectures (ISAs), such as the x86, PowerPC, SPARC, or MIPS ISAs, or any other suitable ISA. In multiprocessor systems, each of processors 3010 may commonly, but not necessarily, implement the same ISA.

System memory 3020 may be configured to store instructions and data accessible by processor(s) 3010. In various embodiments, system memory 3020 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing one or more desired functions, such as those methods, techniques, and data described above, are shown stored within system memory 3020 as code 3025 and data 3026.

In one embodiment, I/O interface 3030 may be configured to coordinate I/O traffic between processor 3010, system memory 3020, and any peripheral devices in the device, including network interface 3040 or other peripheral interfaces. In some embodiments, I/O interface 3030 may perform any necessary protocol, timing or other data transformations to convert data signals from one component (e.g., system memory 3020) into a format suitable for use by another component (e.g., processor 3010). In some embodiments, I/O interface 3030 may include support for devices attached through various types of peripheral buses, such as a variant of the Peripheral Component Interconnect (PCI) bus standard or the Universal Serial Bus (USB) standard, for example. In some embodiments, the function of I/O interface 3030 may be split into two or more separate components, such as a north bridge and a south bridge, for example. Also, in some embodiments some or all of the functionality of I/O interface 3030, such as an interface to system memory 3020, may be incorporated directly into processor 3010.

Network interface 3040 may be configured to allow data to be exchanged between computing device 3000 and other devices 3060 attached to a network or networks 3050, such as other computer systems or devices as illustrated in FIG. 1 through FIG. 8, including various devices serving as endpoints or clients, for example. In various embodiments, network interface 3040 may support communication via any suitable wired or wireless general data networks, such as types of Ethernet network, for example. Additionally, network interface 3040 may support communication via telecommunications/telephony networks such as analog voice networks or digital fiber communications networks, via storage area networks such as Fibre Channel SANs, or via any other suitable type of network and/or protocol.

In some embodiments, system memory 3020 may be one embodiment of a computer-accessible medium configured to store program instructions and data as described above for FIG. 1 through FIG. 8 for implementing embodiments of the corresponding methods and apparatus. However, in other embodiments, program instructions and/or data may be received, sent or stored upon different types of computer-accessible media. Generally speaking, a computer-accessible medium may include non-transitory storage media or memory media such as magnetic or optical media, e.g., disk or DVD/CD coupled to computing device 3000 via I/O interface 3030. A non-transitory computer-accessible storage medium may also include any volatile or non-volatile media such as RAM (e.g. SDRAM, DDR SDRAM, RDRAM, SRAM, etc.), ROM, etc., that may be included in some embodiments of computing device 3000 as system memory 3020 or another type of memory. Further, a computer-accessible medium may include transmission media or signals such as electrical, electromagnetic, or digital signals, conveyed via a communication medium such as a network and/or a wireless link, such as may be implemented via network interface 3040. Portions or all of multiple computing devices such as that illustrated in FIG. 9 may be used to implement the described functionality in various embodiments; for example, software components running on a variety of different devices and servers may collaborate to provide the functionality. In some embodiments, portions of the described functionality may be implemented using storage devices, network devices, or special-purpose computer systems, in addition to or instead of being implemented using general-purpose computer systems. The term "computing device", as used herein, refers to at least all these types of devices, and is not limited to these types of devices.

CONCLUSION

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g. SDRAM, DDR, RDRAM, SRAM, etc.), ROM, etc., as well as transmission media or signals such as electrical, electromagnetic, or digital signals, conveyed via a communication medium such as network and/or a wireless link.

The various methods as illustrated in the Figures and described herein represent exemplary embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended to embrace all such modifications and changes and, accordingly, the above description to be regarded in an illustrative rather than a restrictive sense.

What is claimed is:

1. A system, comprising:
   one or more computing devices configured to implement, via one or more hardware processors of the one or more computing devices, a network-accessible security mechanism evaluation service configured to:
   receive, on behalf of a client and via one or more programmatic interfaces, an evaluation request for one or more security mechanisms, wherein the evaluation request includes at least one parameter to determine resources of a provider network to be used for evaluating the one or more security mechanisms, wherein the at least one parameter comprises one or more of: (a) a service usage type or duration, (b) one or more types of analysis to be performed, (c) one or more time constraints, (d) one or more budget limits, or (e) identification information for the client; and
   in accordance with the evaluation request received on behalf of the client via a programmatic interface of the one or more programmatic interfaces, wherein the evaluation request indicates a particular security mechanism using public-key encryption:
   identify, in accordance with the at least one parameter of the evaluation request, one or more resources of the provider network to be used to evaluate the particular security mechanism, wherein to identify the one or more resources, the service is configured to determine, based at least in part on the at least one parameter, (a) an upper bound on computing capacity to be dedicated to respond to the evaluation request, and (b) one or more compute resources of the provider network in accordance with the upper bound;
   obtain, using the one or more resources: (a) a trustworthiness indicator for a certificate authority that issued a public-key certificate in accordance with the particular security mechanism; (b) a result of a syntax analysis of the public-key certificate; and (c) a vulnerability indicator for a key pair used in accordance with the particular security mechanism; and provide, to the client, an evaluation response including the trustworthiness indicator, the result of the syntax analysis, and the vulnerability indicator.

2. The system as recited in claim 1, wherein the service is configured to:
   maintain a database comprising representations of previously-evaluated public-key certificates; and
   in response to a determination that (a) the client is willing to add the public-key certificate to the database, and (b) the public-key certificate is not present in the database, add the public-key certificate to the database.

3. The system as recited in claim 2, wherein, to obtain the vulnerability indicator, the service is configured to:
   compute a greatest-common-divisor (GCD) between a modulus for a public key in the public-key certificate and a modulus for a public key from among a plurality of public keys in the public-key certificates in the database; and
   repeat a GCD computation between the modulus for the public key in the public-key certificate and another modulus for another public key from among the plurality of public keys until an amount of time has elapsed corresponding to a parameter indicating a time limit;
   wherein the vulnerability indicator is set to high in response to finding a GCD between the modulus for the public key and at least one of the public keys from among the plurality of public keys;
   wherein the vulnerability indicator is set to low in response to not finding a GCD between the modulus for the public key and at least one of the public keys from among the plurality of public keys;
   wherein the database includes publicly available public-key certificates; and
   wherein, to optimize the GCD computations, the service is operable to store, in a persistent store, a set of intermediate results of previously-performed GCD computations.

4. The system as recited in claim 1, wherein, to obtain the trustworthiness indicator, the service is configured to maintain a plurality of certificate authority records, wherein a particular certificate authority record identifies a corresponding certificate authority and comprises (a) certificate revocation history associated with the corresponding certificate authority and (b) certificate syntax error history associated with the corresponding certificate authority.

5. A method, comprising:
receiving, on behalf of a client and via one or more programmatic interfaces, an evaluation request for one or more security mechanisms, wherein the evaluation request comprises a parameter to determine resources of a provider network to be used for evaluating the one or more security mechanisms, wherein the parameter comprises one or more of: (a) a service usage type or duration, (b) one or more types of analysis to be performed, (c) one or more time constraints, (d) one or more budget limits, or (e) identification information for the client; and
in accordance with the evaluation request received on behalf of the client via a programmatic interface of the one or more programmatic interfaces, wherein the evaluation request indicates a particular security mechanism using public-key encryption:
identifying, in accordance with the parameter of the evaluation request, one or more resources of the provider network to be used to evaluate the particular security mechanism, wherein said identifying comprises determining, based at least in part on the parameter, (a) an upper bound on computing capacity to be dedicated to respond to the evaluation request, and (b) one or more compute resources of the provider network in accordance with the upper bound; and providing, to the client, based at least in part on using the one or more resources, one or more of: (a) a trustworthiness indicator for a certificate authority that issued a public-key certificate in accordance with the particular security mechanism; (b) a result of a syntax analysis of the public-key certificate; (c) a vulnerability indicator for a key pair used in accordance with the particular security mechanism; or (d) a result of an IP (Internet Protocol) address mapping verification operation for a domain name included in the public-key certificate.

6. The method as recited in claim 5, further comprising:
maintaining a database comprising representations of previously-evaluated public-key certificates to be used in evaluating the particular security mechanism; and
adding the public-key certificate to the database.

7. The method as recited in claim 5, wherein said obtaining the vulnerability indicator comprises performing a set of greatest-common-divisor (GCD) computations.

8. The method as recited in claim 7, further comprising:
storing in a persistent store, a set of intermediate results of previously-performed GCD computations; and
optimizing the set of GCD computations using the persistent store.

9. The method as recited in claim 8, wherein the set of intermediate results comprises one or more of: (a) a tree of products obtained in the GCD computations, or (b) a tree of remainders obtained in the GCD computations.

10. The method as recited in claim 5, wherein said obtaining the trustworthiness indicator comprises maintaining a plurality of certificate authority records, wherein a particular certificate authority record identifies a corresponding certificate authority and comprises certificate revocation history associated with the corresponding certificate authority.

11. The method as recited in claim 10, further comprising:
obtaining said certificate revocation history using one or more of (a) reports of certificate revocation obtained from one or more clients, (b) certificate revocation lists provided by one or more certificate authorities, or (c) communications performed in accordance with the online certificate status protocol (OCSP).

12. The method as recited in claim 10, wherein the particular certificate authority record comprises a certificate syntax error history associated with the corresponding certificate authority.

13. The method as recited in claim 5, further comprising:
receiving, via another programmatic interface, a subscription request for security mechanism evaluation from a different client, wherein the subscription request comprises an indication of a subscription period during which ongoing evaluation of specified security mechanisms is to be conducted on behalf of the different client; and
providing, to the different client, one or more evaluation reports for the specified security mechanisms corresponding to the subscription period.

14. The method as recited in claim 5, further comprising:
providing a summary score to the client indicative of a quality of the particular security mechanism, wherein the summary score is based at least in part on one or more of: the vulnerability indicator, the trustworthiness indicator or the syntax analysis.

15. The method as recited in claim 5, further comprising:
receiving an indication from the client of a preferred pricing policy to be used in determining a billing amount to be determined for the evaluation request, wherein the preferred pricing policy indicates at least one of: (a) a subscription-based upfront fee, (b) a fee based on a number of evaluations performed on behalf of the client, or (c) a fee based on the resources used in responding to the evaluation request; and
generating a billing amount to be paid by the client, based at least in part on the preferred pricing policy.

16. The method as recited in claim 5, further comprising:
implementing another programmatic interface enabling a key-generating entity to submit a request to evaluate a vulnerability of a proposed public key; and
in response to a request from a key-generating entity received via the other programmatic interface, providing an evaluation of the vulnerability of the proposed public key.

17. A non-transitory computer-accessible storage medium storing program instructions that when executed on one or more hardware processors implement a security mechanism evaluation service configured to:
receive, on behalf of a client and via one or more programmatic interfaces, an evaluation request for one or more security mechanisms, wherein the evaluation request comprises a parameter for determining provider network resources to use to evaluate the one or more security mechanisms, wherein the parameter comprises one or more of: (a) a service usage type or duration, (b) one or more types of analysis to be performed, (c) one or more time constraints, (d) one or more budget limits, or (e) identification information for the client; and
in accordance with the evaluation request received on behalf of the client via a programmatic interface of the one or more programmatic interfaces, wherein the evaluation request indicates a particular security mechanism using public-key encryption:
identify, in accordance with the parameter of the evaluation request, one or more resources of the provider network to be used to evaluate the particular security mechanism, wherein to identify the one or more resources, the service is configured to determine, based at least in part on the parameter, (a) an upper bound on computing capacity to be dedicated to respond to the evaluation request, and (b) one or more compute resources of the provider network in accordance with the upper bound; and provide, to the client, based at least in part on using the one or more resources, one or more of: (a) a trustworthiness indicator for a certificate authority that issued a public-key certificate in accordance with the particular security mechanism; (b) a result of a syntax analysis of the public-key certificate; or (c) a vulnerability indicator for a key pair used in accordance with the particular security mechanism.

18. The non-transitory computer-accessible storage medium as recited in claim 17, wherein to obtain the vulnerability indicator, the instructions when executed on the one or more hardware processors perform a set of factorization computations.

19. The non-transitory computer-accessible storage medium as recited in claim 17, wherein the instructions when executed on the one or more hardware processors:

receive, via another programmatic interface, a subscription request for security mechanism evaluation from a different client, wherein the subscription request comprises an indication of a subscription period during which ongoing evaluation of specified security mechanisms is to be conducted on behalf of the different client; and provide, to the different client, one or more evaluation reports for the specified security mechanisms corresponding to the subscription period.

20. The non-transitory computer-accessible storage medium as recited in claim 17, wherein the instructions when executed on the one or more hardware processors:

receive an indication from the client of a preferred pricing policy to be used in determining a billing amount to be determined for the evaluation request, wherein the preferred pricing policy indicates at least one of: (a) a subscription-based upfront fee, (b) a fee based on a number of evaluations performed on behalf of the client, or (c) a fee based on the resources used in responding to the evaluation request; and generate a billing amount to be paid by the client, based at least in part on the preferred pricing policy.

21. The non-transitory computer-accessible storage medium as recited in claim 17, wherein the instructions when executed on the one or more hardware processors:

implement another programmatic interface enabling a submission of a request to evaluate a vulnerability of a proposed public key; and in response to a request received via the other programmatic interface, provide an evaluation of the vulnerability of the proposed public key.

22. The non-transitory computer-accessible storage medium as recited in claim 17, wherein the public-key certificate is formatted in accordance with the X.509 standard.

* * * * *